United States Patent [19]

Ritsko

[11] 3,956,474

[45] May 11, 1976

[54] PROCESS FOR PRODUCING AMMONIUM METATUNGSTATE FROM AMMONIUM TUNGSTATE BY DIGESTION IN SILICA

[75] Inventor: Joseph E. Ritsko, Towanda, Pa.

[73] Assignee: GTE Sylvania Incorporated, Stamford, Conn.

[22] Filed: Jan. 27, 1975

[21] Appl. No.: 544,058

[52] U.S. Cl............................. 423/593; 23/302 A
[51] Int. Cl.²......................................... C01G 41/00
[58] Field of Search....................... 423/58, 61, 593; 242/458

[56] References Cited
UNITED STATES PATENTS

| | | | |
|---|---|---|---|
| 3,175,881 | 3/1965 | Chiola et al. | 423/593 |
| 3,591,331 | 7/1971 | Chiola et al. | 423/593 |
| 3,773,692 | 11/1973 | Hensel et al. | 252/458 X |
| 3,857,928 | 12/1974 | Kim et al. | 423/593 |
| 3,857,929 | 12/1974 | Quatrini et al. | 423/593 |

*Primary Examiner*—Herbert T. Carter
*Attorney, Agent, or Firm*—Norman J. O'Malley; John C. Fox; Donald R. Castle

[57] ABSTRACT

A process for producing ammonium metatungstate (AMT) from ammonium tungstate (AT) solution is described which involves the addition of about 3.6 percent by weight of silica to an AT solution, digestion for at least about 4 hours at a temperature of at least about 98°C, followed by filtration to remove the silica from the AMT solution. Typically about 0.4 percent by weight of silica remains after filtering. The resulting AMT solution may be further processed to recover solid AMT, such as by evaporation or spray drying.

3 Claims, No Drawings

PROCESS FOR PRODUCING AMMONIUM METATUNGSTATE FROM AMMONIUM TUNGSTATE BY DIGESTION IN SILICA

BACKGROUND OF THE INVENTION

This invention relates to a process for producing ammonium metatungstate (AMT), and more particularly, relates to producing AMT directly from ammonium tungstate (AT) solution by digestion in the presence of silica.

At present both ammonium paratungstate (APT) and AMT are being used as tungsten sources in the catalyst industry. Since APT has a limited solubility in water (about 2 to 3 percent at room temperature), the user converts APT to a more soluble peroxytungstate form by means of reaction with hydrogen peroxide in order to prepare the catalyst. While AMT is highly water soluble, and thus need not be converted, it is in general more expensive than APT, due to the complexity and/or low yields of processes for producing it.

One of the techniques being used to produce crystalline AMT at the present time involves production from APT by a process described in U.S. Pat. No. 3,175,881. Although this process overcomes some of the disadvantages of the prior art, in practice it is somewhat difficult to control for maximum conversion. As a consequence, on crystallization of AMT from solution, the residual APT must be removed in order to produce completely water soluble AMT products. Another disadvantage of this process is its intermittent batch nature, requiring baking, digesting, filtering and concentrating of solutions before crystallization. On a production scale, such step-wise operations tend to be time consuming and costly.

As an improvement over the above process, a method for producing AMT directly from AT solution without an appreciable formation of APT is described in U.S. Pat. No. 3,591,331. In this process, AT solution is contacted with a liquid extraction system consisting of Di-2-Ethyhexyl phosphoric acid (D-2-EHPA) — tri-n-butyl phosphate (TBP) — kerosene which extracts ammonium ion and rapidly lowers the pH to the AMT-forming region. The solution is then digested to allow formation of AMT.

While this method substantially avoids the formation of APT and is ammenable to continuous processing, it has not found widespread usage due to a tendency toward instability of the organic system, and resultant formation of insoluble phospho-tungstates in amounts up to 10 percent or more of the total solid product, depending upon the conditions of formation.

Two additional methods for producing AMT directly from AT solution without the appreciable formation of APT involve contacting AT solution with ion exchange resins, and are the subjects of U.S. Pat. Nos. 3,857,928 and 3,857,929, assigned to the present assignee. While one of these processes is ammenable to continuous processing, U.S. Pat. No. 3,857,928, both processes require periodic resin regeneration.

SUMMARY OF THE INVENTION

In accordance with the invention, it has been discovered that contacting an ammonium tungstate (AT) solution with at least about 1.5 percent by weight of silica ($WO_3$ basis), and digesting the solution while in contact with the silica at a temperature of at least about 98°C for at least about 4 hours results in substantially complete conversion of AT solution to AMT solution without appreciable formation of APT, which when filtered and crystallized yields solid AMT containing from about 0.3 to about 0.6 percent by weight residual silica.

DETAILED DESCRIPTION OF THE INVENTION

For a better understanding of the present invention, together with other and further objects, advantages and capabilities thereof, reference is made to the following disclosure and appended claims in connection with the description of some of the aspects of the invention.

The AT feed solution can be prepared by any of the previously known procedures, including solvent extraction processing of tungsten ore values, dissolution of tungstic acid in ammonium hydroxide, and the like. The concentration of ammonium tungstate in the starting feed solution can vary from less than 1 gram per liter to about 250 grams per liter, $WO_3$ basis. A feed solution of from about 150 grams per liter to about 200 grams per liter $WO_3$ basis is preferred from a capacity and equipment investment viewpoint on the basis of cost per unit of tungsten processed. Such tungsten solutions will generally have a pH ranging from about 9 to 11.

At least about 1.5 percent by weight of silica, $WO_3$ basis, is required for effective conversion. About 3 to 4 percent by weight will generally result in substantially complete conversion of AT to AMT solution within about 4 to 12 hours.

A particular advantage of the invention is that the silica used in digestion and subsequently filtered from the digested solution of AMT may be reused repeatedly, that is, its capacity to promote formation of AMT is not diminished with use. While the exact mechanism is not well understood at this time, the role of silica is to prevent the precipitation of insoluble APT and therefor to allow lowering of the pH to the AMT forming region, about 4 to 4.5.

After digestion is completed, the silica is removed, such as by filtering, and the solid AMT may be recovered in the conventional manner, such as by evaporation or spray drying.

The silica used in the invention may be any commercially available silica, provided that its impurities, both in kind and amount, are consistent with the final envisioned application for the AMT. For example, both sodium and phosphorus may be considered objectionable impurities for certain catalyst applications. Residual silica which cannot be removed from the digested AMT solution by filtering is generally below 1 percent by weight, and typically from 0.3 to 0.6 weight percent $WO_3$ basis, and is compatible with many catalyst applications.

To illustrate the invention in further detail, an example is presented.

EXAMPLE

To 3600 milliliters of AT solution containing 2.4 pounds $WO_3$ per gram of solution were added 30 grams of silica as a finely divided powder obtainable under the tradename CAB-O-SIL. The resulting slurry was digested for about 6 hours at 98°C after which the volume of the solution had decreased to about 1000 milliliters and the pH of the solution had decreased to about 4. The silica gel which had formed was then filtered from the solution and subsequently recycled. The solution was then spray dried at a temperature within the range of about 350°C to 125°C. Upon analysis it was revealed that the spray dried product contained 0.54 weight percent silica and 0.023 weight percent sodium, $WO_3$ basis. X-ray diffraction analysis confirmed that the solid product was ammonium metatungstate.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing ammonium metatungstate from ammonium tungstate solution the process comprising:

a. adding at least about 1.5 weight percent of silica on a $WO_3$ basis to a solution consisting essentially of ammonium tungstate,
   b. digesting the solution at a temperature of at least about 98°C for at least about 4 hours to lower the pH thereof to below at least about 4.5 and to form metatungstate ions, and
   c. separating the aqueous AMT solution containing the metatungstate ions from the silica.

2. The process of claim 1 wherein the silica is present in the amount of from about 3 to 4 weight percent.

3. Method of claim 1 in which following separation from the silica, solid ammonium metatungstate is crystallized from the aqueous AMT solution.

* * * * *